United States Patent
Wu et al.

(10) Patent No.: US 10,146,193 B2
(45) Date of Patent: Dec. 4, 2018

(54) METHOD FOR REGULATING PRIMARY FREQUENCY OF POWER GRID BASED ON AIR CONDITIONING LOAD CLUSTER IN LARGE BUILDING

(71) Applicant: Tsinghua University, Beijing (CN)

(72) Inventors: Wenchuan Wu, Beijing (CN); Boming Zhang, Beijing (CN); Zihao Li, Beijing (CN); Hongbin Sun, Beijing (CN); Bin Wang, Beijing (CN); Qinglai Guo, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 15/609,510

(22) Filed: May 31, 2017

(65) Prior Publication Data
US 2017/0351228 A1    Dec. 7, 2017

(30) Foreign Application Priority Data
Jun. 6, 2016 (CN) .......................... 2016 1 0390839

(51) Int. Cl.
| | |
|---|---|
| F24F 11/00 | (2018.01) |
| G05B 13/04 | (2006.01) |
| G05D 23/19 | (2006.01) |
| G05F 1/66 | (2006.01) |
| F24F 11/30 | (2018.01) |
| F24F 11/62 | (2018.01) |

(Continued)

(52) U.S. Cl.
CPC ............ *G05B 13/042* (2013.01); *F24F 11/30* (2018.01); *F24F 11/54* (2018.01); *F24F 11/62* (2018.01); *G05D 23/1917* (2013.01); *G05F 1/66* (2013.01); *H02J 3/14* (2013.01); *F24F 2110/00* (2018.01); *F24F 2140/50* (2018.01)

(58) Field of Classification Search
CPC ............ F24F 11/46; F24F 11/64; F24F 11/86; F24F 11/89; G05B 13/042; G05D 23/00; G05D 23/1917; G05F 1/66
See application file for complete search history.

(56) References Cited

U.S. PATENT DOCUMENTS

| | | | |
|---|---|---|---|
| 2012/0017619 A1* | 1/2012 | Yabuta | F24F 11/0009 62/129 |
| 2015/0345812 A1* | 12/2015 | Murthy | G05B 15/02 700/276 |

* cited by examiner

*Primary Examiner* — Jonathan Bradford
(74) *Attorney, Agent, or Firm* — Hodgson Russ LLP

(57) ABSTRACT

The present disclosure relates to a method for primary frequency regulation of an electric network based on large building air conditioning loads cluster. The method includes the use of a two layer control structure with a central coordinating layer and a local control layer. Each local controller performs a thermal model parameter identification and a local air conditioning autonomous control, and uploads local information to the central controller at the end of each communication interval $t_{gap}$, the central controller broadcasts coordinating information to each local controller. Based on the coordinating information sent from the central controller, each local controller determines whether a power deviation is beyond an action dead zone at the beginning of each action period $t_{act}$, if beyond, then perform a frequency regulation control action, else, perform no action and estimate operation states of all the air conditionings at the beginning of the next action period.

13 Claims, 2 Drawing Sheets

(51) Int. Cl.
*F24F 11/54* (2018.01)
*H02J 3/14* (2006.01)
*F24F 110/00* (2018.01)
*F24F 140/50* (2018.01)

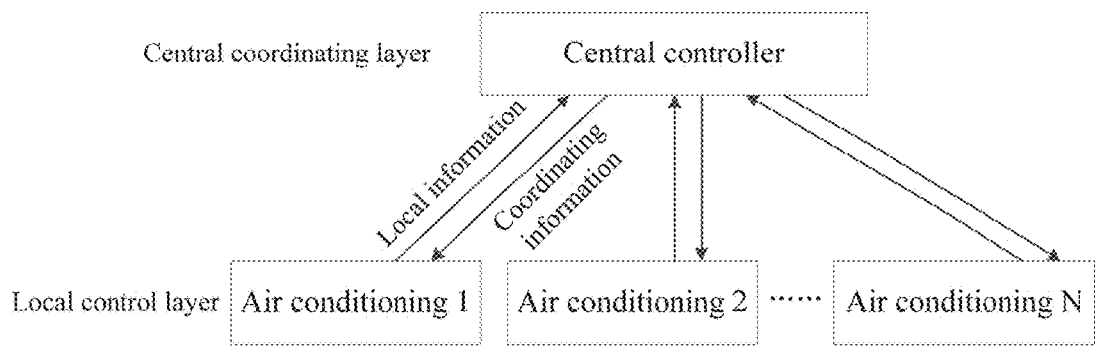

Fig. 1 each local controller performs a thermal model parameter identification and an air conditioning autonomous control to obtain local information corresponding to each of the air conditionings, and uploads the local information to the central controller at an end of each communication interval, the central controller broadcasts coordinating information to each local controller    1 when a communication between the central controller and each of the local controllers in block 1 is finished, based on the coordinating information sent from the central controller, each local controller begins to determine whether a power deviation in the air conditionings is beyond an action dead zone at a beginning of each action period, if yes, a frequency regulation control action is performed, else, no action is performed and operation states of all the air conditionings at a beginning of a next action period are estimated    2

Fig.2

METHOD FOR REGULATING PRIMARY FREQUENCY OF POWER GRID BASED ON AIR CONDITIONING LOAD CLUSTER IN LARGE BUILDING

This application is based on and claims priority to Chinese Patent Application No. 201610390839.X, filed on Jun. 6, 2016, the entire contents of which are incorporated herein by reference.

FIELD

The present disclosure generally relates to a technical field of operation and control of a power system, and more particularly, to a method for regulating the primary frequency of a power grid based on an air conditioner load cluster in a large building.

BACKGROUND

Primary frequency regulation capacity is one of main representations of capabilities of a power system to realize a balance between power generation and loads and to respond to an accident or a disturbance. Traditional primary frequency regulation is generally provided by hydropower generating units or large-scale thermal power generating units having a quickly regulating capability with a response time of seconds. With the connection of large-scale new energy power generation, moment of inertia of the power system is significantly reduced, and randomness and uncontrollability of the power generated in new energy generation may increase frequency regulation burden of the power system. Meanwhile, connection of high voltage direct current transmission replaces a local power source, which further reduces the primary frequency regulation capacity of the system. Therefore, how to develop potentials of the load side to involve in the primary frequency regulation of the system becomes a pressing issue.

Based on load side response mechanism, a viable idea is to organize and manage numerous controllable thermal loads with low monomer power to participate in the primary frequency regulation of power system. Via collecting and processing information and certain control means, cluster loads with thermal energy storage effect, such as air conditioners, may be able to participate in ancillary services, while ensuring comfort of an end user is not significantly affected. This is because that the controllable thermal loads are energy type loads, users care about the total thermal energy released by a power consumption equipment to a thermal environment during a period of time rather than the power at each moment. While an error signal of the primary frequency regulation is an impulse type signal with integration within a period of time approaching to zero, thus will not cause significant change in the final energy output. Meanwhile, the controllable thermal loads have occupied more and more proportions of the total loads and have great potentials. In America, the controllable thermal loads in buildings account for more than 35% of the total power consumption loads of the whole power grid. Air conditioner loads also grow fast in China, where the air conditioner loads may account for more than 20% of the maximum loads of the power grid in summer. Therefore an air conditioner cluster may have a great potential of being a reserve frequency regulation means.

In addition, autonomous temperature dead zone control set for ensuring comfort of users of an air conditioner may cause total power of the air conditioner cluster to change against a requirement of a power-frequency response at some time point, that is a so-called rebound effect. The rebound effect may greatly limit thermal energy storage loads to participate in a load side response and to provide ancillary services to the system.

SUMMARY

The present disclosure aims to solve at least one of the problems existing in the related art to at least some extent.

Embodiments of the present disclosure provide a method for regulating the primary frequency of a power grid based on an air conditioner load cluster in a large building. According embodiments of the present disclosure, a method for regulating the primary frequency of a power grid based on an air conditioner load cluster in a large building is provided, in which, a two-layer control structure including a central coordinating layer and a local control layer is used in the air conditioner load cluster, the central coordinating layer includes a central controller, the local control layer includes N local controllers, N air conditioners, and temperature sensors and frequency sensors provided in rooms the air conditioners located in.

The method includes the following steps:

1) performing, by each local controller, a thermal model parameter identification and an air conditioner autonomous control to obtain local information corresponding to each of the air conditioners, and uploading the local information to the central controller at an end of each communication interval $t_{gap}$, and broadcasting, by the central controller, coordinating information to each local controller;

2) when a communication between the central controller and each of the local controllers in step 1) is finished, based on the coordinating information sent from the central controller, determining, by each local controller, whether a power deviation in the air conditioners is beyond an action dead zone at a beginning of each action period $t_{act}$, if yes, a frequency regulation control action is performed, else, no action is performed and operation states of all the air conditioners at a beginning of a next action period are estimated. if a current time reaches to a beginning of a next communication interval, step 1) is executed, else, step 2) is repeated.

BRIEF DESCRIPTION OF THE DRAWINGS

FIG. 1 is a schematic diagram showing a two-layer control structure used in embodiments of the present disclosure.

FIG. 2 is a flow chart showing a method regulating primary frequency of a power grid based on an air conditioner load cluster in a large building according to embodiments of the present disclosure.

DETAILED DESCRIPTION

Figure 3:
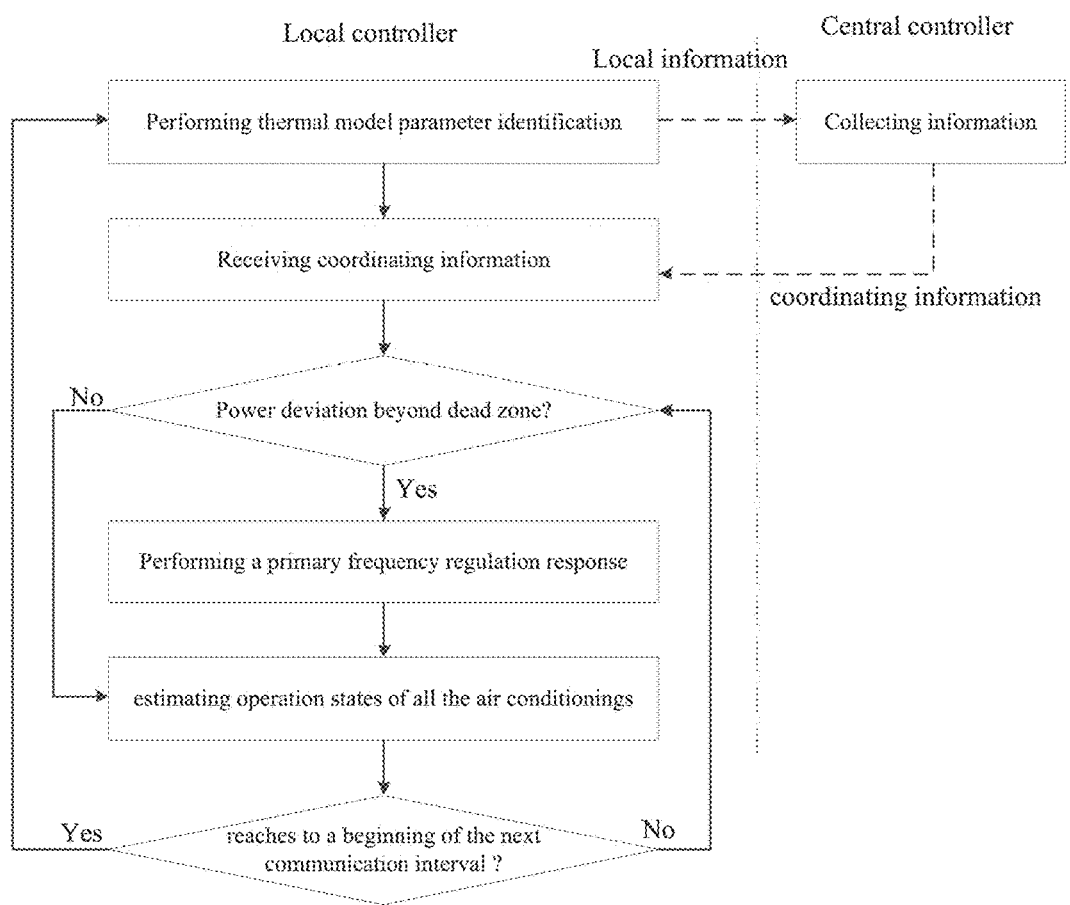
FIG. 3 is a flow chart showing a method regulating primary frequency of a power grid based on an air conditioner load cluster in a large building according to embodiments of the present disclosure.

A method for regulating the primary frequency of a power grid based on an air conditioner load cluster in a large building provided in the present disclosure will be described in combination with embodiments and with reference to drawings as follows.

The present embodiment is shown as FIG. 1, a two-layer, i. e. a central coordinating layer and a local control layer, control structure is used in an air conditioner loads cluster. The central coordinating layer includes a central controller. The local control layer includes N local controllers, N air conditioners and temperature sensors and frequency sensors provided in rooms the air conditioners located in.

In some embodiments, the central controller and the local controllers may communicate in bothways at every communication interval. The local controllers acquire data from the temperature sensors at each temperature acquisition period. A communication among the central controller and each of the local controllers is in a way of wireless communication. A communication between each of the local controllers and each of the air conditioners, each of the temperature sensors or the frequency sensors may be in a way of wireless communication or wire communication. The local controllers regulate and control the local air conditioners once during each action period according to local information and coordinating information transmitted from the central controller.

As shown in FIG. 2 and FIG. 3, a method for regulating the primary frequency of a power grid based on an air conditioner load cluster in a large building provided in the present disclosure includes following acts.

In block 1, each local controller performs a thermal model parameter identification and an air conditioner autonomous control to obtain local information corresponding to each of the air conditioners, and uploads the local information to the central controller at an end of each communication interval $t_{gap}$, the central controller broadcasts coordinating information to each local controller.

In an embodiment of the present disclosure, the communication interval $t_{gap}$ may be a period between 15 seconds to 1 minute.

In block 2, when a communication between the central controller and each of the local controllers in block 1 is finished, based on the coordinating information sent from the central controller, each local controller begins to determine whether a power deviation in the air conditioners is beyond an action dead zone at a beginning of each action period $t_{act}$, if yes, a frequency regulation control action is performed, else, no action is performed and operation states of all the air conditioners at a beginning of a next action period are estimated.

If a current time reaches to a beginning of a next communication interval, block 1 is executed, else, block 2 is repeated.

In an embodiment of the present disclosure, the action period $T_{act}$ may be 1 second or other preset times.

In an embodiment of the present disclosure, the next action period is an action period $t_{act}$ interval from current moment, i.e. there is one action period $t_{act}$ between the beginning of the next action period and the current moment.

In some embodiments, block 1 includes following sub-acts.

Each local controller i, i=1.2 . . . N, performs the room thermal model parameter identification according to air temperature data recorded at each temperature acquisition period to obtain thermal model parameters corresponding to each room. N is a number of the local controllers.

In some embodiments, a precision degree of the thermal model parameters is determined according to a hardware storage capability of the local controller and an error requirement between a thermal model identification curve and an actual temperature curve.

In some embodiments, for each air conditioner room i, i=1.2 . . . N, three precision degrees of thermal model may be determined. The three precision degrees of thermal model include a zero-order thermal model, a first-order thermal model, and a second-order thermal model represented by equations (1)-(3) respectively.

$$\Delta T_i = \alpha_i \Delta t_i \quad (1)$$

$$\Delta T_i = \alpha_i e^{\gamma_i \Delta t_i} - \alpha_i \quad (2)$$

$$\Delta T_i = \alpha_{i1} e^{\gamma_{i1} \Delta t_i} + \alpha_{i2} e^{\gamma_{i2} \Delta t_i} - \alpha_{i1} - \alpha_{i2} \quad (3)$$

where, numbers of parameters to be identified in the three precision degrees of thermal models are 1, 2, and 4 respectively, i.e. $\alpha_i$ in equation (1) is a thermal model parameter to be identified in the zero-order thermal model, $\alpha_i$, $\gamma_i$ in equation (2) are thermal model parameters to be identified in the first-order thermal model, $\alpha_{i1}$, $\gamma_{i1}$, $\alpha_{i2}$, $\gamma_{i2}$ in equation (3) are thermal model parameters to be identified in the second-order thermal model, $\Delta T_i$ (an initial value of switching temperature for short) is a difference between a current temperature $Ta_i$ and an indoor temperature $Ta_i^{tog}$ when an on-off state of the air conditioner is last switched, and $\Delta t_i$ (an initial value of switching time for short) is a difference between a current time and a time $t_i^{tog}$ when an on-off state of the air conditioner is last switched, and, $$\Delta T_i = Ta_i - Ta_i^{tog} \quad (4)$$

$$\Delta t_i = t_i - t_i^{tog} \quad (5)$$

The initial value of switching temperature $Ta_i^{tog}$ and the initial value of switching time $t_i^{tog}$ are taken as parameters of the thermal model as well as $\alpha_i$ in equation (1), $\alpha_i$, $\gamma_i$ in equation (2), or $\alpha_{i1}$, $\gamma_{i1}$, $\alpha_{i2}$, $\gamma_{i2}$ in equation (3).

The local controller i identifies parameters of the thermal model corresponding to room i according to air temperature data recorded at each temperature acquisition period $t_{temp}$ (a period between 1 to 4 seconds) in a communication interval $t_{gap}$ to obtain thermal model parameters corresponding to each room.

In some embodiments, k is denoted as a number of times that the temperature is recorded, and the on-off state state$_i$ (where state$_i$=1 corresponding to state ON, state$_i$=0 corresponding to state OFF) of the air conditioner i is recorded at each time a temperature is recorded. When a zero-order (linear) thermal model is selected, a corresponding parameter identification model is $$\min\left\{\sum_k [(Ta_i^k - Ta_i^{tog}) - \alpha(t_i^k - t_i^{tog})]^2\right\},$$

when an on-off state of the air conditioner i is state$_i$=1, state parameter $\alpha_i^{ON}$ corresponding to the ON state is identified according to currently recorded k sets of switching temperature and switching time, when the on-off state of the air conditioner i is state$_i$=0, state parameter $\alpha_i^{OFF}$ corresponding to the OFF state is identified according to currently recorded k sets of switching temperature and switching time. When a first-order model is selected, a corresponding parameter identification model is $$\min\left\{\sum_k \left[(Ta_i^k - Ta_i^{tog}) - \left(\alpha e^{\gamma(t_i^k - t_i^{tog})} - \alpha\right)\right]^2\right\},$$

similarly, two sets of parameters $\alpha_i^{ON}$, $\gamma_i^{ON}$ and $\alpha_i^{OFF}$, $\gamma_i^{OFF}$ are identified in different states ON and OFF respectively.

When a two-order model is selected, a corresponding parameter identification model is $$\min\left\{\sum_k \left[(Ta_i^k - Ta_i^{tog}) - \left(\alpha_1 e^{\gamma_1(t_i^k - t_i^{tog})} + \alpha_2 e^{\gamma_2(t_i^k - t_i^{tog})} - \alpha_1 - \alpha_2\right)\right]^2\right\},$$

similarly, two sets of parameters $\alpha_{i1}^{ON}, \gamma_{i1}^{ON}, \alpha_{i2}^{ON}, \gamma_{i2}^{ON}$ and $\alpha_{i1}^{OFF}, \gamma_{i1}^{OFF}, \alpha_{i2}^{OFF}, \gamma_{i2}^{OFF}$ are identified in different states ON and OFF respectively.

In some embodiments of the present disclosure, a same thermal model is selected to use for all the local controllers. In an embodiment, a first-order model is selected to use for all the local controllers, the identified parameters of the i th room are $\alpha_i^{ON}, \gamma_i^{ON}$ and $\alpha_i^{OFF}, \gamma_i^{OFF}$ via common algorithms.

Each local controller performs the air conditioner autonomous control, according to following equations.

$$\text{state}_i = \begin{cases} 1, & Ta_i \geq \overline{T}_i \ \& \ \text{state}_i = 0 \\ 0, & Ta_i \leq \underline{T}_i \ \& \ \text{state}_i = 1 \end{cases} \quad (6)$$

$$\overline{T}_i = Ts_i + \Delta_i, \ \underline{T}_i = Ts_i - \Delta_i \quad (7)$$

In the above equations, i=1.2 ... N, $Ta_i$ is an air temperature in the i th room, $\Delta_i$ is a temperature control dead zone corresponding to the i th air conditioner, $\overline{T}_i$ corresponds to an upper bound of the temperature control dead zone $\Delta_i$, $\underline{T}_i$ corresponds to a lower bound of the temperature control dead zone $\Delta_i$, $Ts_i$ is the required temperature set by the user, state$_i$ is the on-off state of the i th conditioner (state$_i$=1 corresponds to state ON, state$_i$=0 correspond to state OFF).

Denoting an i th local controller, an i th air conditioner and an i th room with mark i, i=1.2 ... N. An air temperature in the i th room is $Ta_i$. An on-off state of the i th air conditioner is state$_i$ (where state$_i$=1 corresponding to state ON, state$_i$=0 corresponding to state OFF). In some embodiments, it is assumed that the i th air conditioner is a constant power air conditioner with an operation power $P_i$ and with on-off state controlled only.

Each temperature sensor acquires an indoor air temperature of a corresponding room in real-time. Each local controller acquires the temperature data from a corresponding temperature sensor every temperature acquisition period $t_{temp}$ (for example, a period between 1 to 4 seconds).

A required temperature $Ts_i$ of each air conditioner i is set directly by the user, and each air conditioner i has a temperature control dead zone $\Delta_i$, which is a factory setting attribute, and in an embodiment, $\Delta_i$ is assumed to be 1° C. Equation (6) shows that if state$_i$=0, i. e. the air conditioner is in an OFF state, when the room air temperature $Ta_i$ rises to the upper bound $\overline{T}_i$ of the temperature control dead zone of the i th local air conditioner, the i th local controller turns on the i th air conditioner autonomously; if state$_i$=1, i. e. the air conditioner is in an ON state, when the room air temperature $Ta_i$ drops to the lower bound $\underline{T}_i$ of the temperature control dead zone of the i th local air conditioner, the i th local controller turns off the i th air conditioner autonomously.

At an end moment (i.e. a communication moment) of the communication interval $t_{gap}$ between the local controller and the central controller, each local controller uploads the local information to the central controller.

The local information includes the indoor air temperature acquired most recently $Ta_i$ of the room, the on-off state state$_i$ of the air conditioner, the operation power $P_i$ the required temperature $Ts_i$, the temperature control dead zone $\Delta_i$, and the thermal model parameters $\alpha_i^{ON}, \gamma_i^{ON}, \alpha_i^{OFF}, \gamma_i^{OFF}, Ta_i^{tog}$, and $t_i^{tog}$.

The central controller collects all the local information from the local controllers and broadcasts all collected information to each local controller as the coordinating information, and the central controller obtains a reference power $P0_i$ of each air conditioner after the thermal model parameters corresponding to each local controller are collected, a sum of reference powers of all the air conditioners is obtained as a reference power P0 of all the air conditioners, and the reference power of all the air conditioners P0 is broadcasted to each local controller.

The coordinating information includes the indoor air temperature $Ta_i$, the on-off state state$_i$, the operation power $P_i$, the required temperature $Ts_i$, the temperature control dead zone $\Delta_i$, and the thermal model parameters $\alpha_i^{ON}, \gamma_i^{ON}, \alpha_i^{OFF}, \gamma_i^{OFF}, Ta_i^{tog}$, and $t_i^{tog}$.

In some embodiments, the reference power $P0_i$ corresponds to an average power of the i th air conditioner during an on-off period $T_i$ (referring to a time period during which the i th air conditioner switches its on-off state in one cycle according to a local autonomous control logic) in a communication interval $t_{gap}$.

The acts of "the central controller collects all the local information from the local controllers and broadcasts all collected information to each local controller as the coordinating information, and the central controller obtains a reference power $P0_i$ of each air conditioner after the thermal model parameters corresponding to each local controller are collected, a sum of reference powers of all the air conditioners is obtained as a reference power P0 of all the air conditioners, and the reference power of all the air conditioners P0 is broadcasted to each local controller" may include following acts.

The central controller calculates a first time $t_i^{(1)}$, a second time $t_i^{(1)}$, a third time $t_i^{(1)}$, and a fourth time $t_i^{(1)}$ by solving the following equations respectively according to the upper $\overline{T}_i$, the lower temperature bound $\underline{T}_i$, the thermal model parameters $\alpha_i^{ON}, \gamma_i^{ON}, \alpha_i^{OFF}, \gamma_i^{OFF}, Ta_i^{tog}$, and $t_i^{tog}$, the required temperature $Ts_i$, and the temperature control dead zone $\Delta_i$.

$$\overline{T}_i - Ta_i^{tog} = \alpha_i^{ON} e^{\gamma_i^{ON}(t_i^{(1)} - t_i^{tog})} - \alpha_i^{ON}$$

$$\underline{T}_i - Ta_i^{tog} = \alpha_i^{ON} e^{\gamma_i^{ON}(t_i^{(2)} - t_i^{tog})} - \alpha_i^{ON}$$

$$\overline{T}_i - Ta_i^{tog} = \alpha_i^{OFF} e^{\gamma_i^{OFF}(t_i^{(3)} - t_i^{tog})} - \alpha_i^{OFF}$$

$$\underline{T}_i - Ta_i^{tog} = \alpha_i^{OFF} e^{\gamma_i^{OFF}(t_i^{(4)} - t_i^{tog})} - \alpha_i^{OFF}$$

In above equations, $t_i^{(1)}$ is a moment when the indoor temperature is equal to the upper bound temperature $\overline{T}_i$ and the air conditioner is in an "ON" state; $t_i^{(2)}$ is a moment when the indoor temperature is equal to the lower bound temperature $\underline{T}_i$ and the air conditioner is in an "ON" state; $t_i^{(3)}$ is a moment when the indoor temperature is equal to the upper bound temperature $\overline{T}_i$ and the air conditioner is in an "OFF" state; $t_i^{(4)}$ is a moment when the indoor temperature is equal to the lower bound temperature $\underline{T}_i$ and the air conditioner is in an "OFF" state.

A total time period $Ton_i$ when the $i^{th}$ air conditioner is in an "ON" state in an on-off period $T_i$, and a total time period $Toff_i$ when the $i^{th}$ air conditioner is in an "OFF" state in an on-off period $T_i$ are obtained according to following equations.

$$Ton_i = t_i^{(1)} - t_i^{(2)} \qquad (8)$$

$$Toff_i = t_i^{(4)} - t_i^{(3)} \qquad (9)$$

The reference power $P0_i$ of each air conditioner is calculated as:

$$P0_i = \frac{Ton_i}{T_i} P_i = \frac{Ton_i}{Ton_i + Toff_i} P_i \qquad (10)$$

In which, $P0_i$ is an reference power of the $i^{th}$ air conditioner, $Ton_i$ is the total time period when the $i^{th}$ air conditioner is in an "ON" state in an on-off period $T_i$, $Toff_i$ is the total time period when the $i^{th}$ air conditioner is in an "OFF" state in an on-off period $T_i$, $P_i$ is an operation power of the $i^{th}$ air conditioner.

The reference power of all the air conditioners P0 is obtained by summing all the reference powers $P0_i$ of the air conditioners according to following equation.

$$P0 = \sum_i P0_i \qquad (11)$$

The central controller broadcasts the reference power P0 of all the air conditioners to each local controller.

In some embodiments, a control objective of primary frequency regulation response of the air conditioner cluster is set as making a difference $\Delta P$ between a real-time total power P(t) of all the air conditioners and the reference power P0 of all the air conditioners to be directly proportional to a real-time frequency deviation $\Delta f$, satisfying following equation.

$$\Delta P = P(t) - P0 = K(f(t) - f_0) = K\Delta f \qquad (12)$$

In which, $f_0$ is a reference frequency, being 50 Hz for Chinese mainland, $f(t)$ is a real-time frequency obtained by the frequency sensor, K is a power-frequency response coefficient and set to a same value for all the local controllers. K may be determined according to a ratio of a total power of the air conditioner cluster to a maximum frequency fluctuation in history. The greater K is, the more the air conditioner involves in the frequency regulation, and the smaller K is, the less the air conditioner involves in the frequency regulation.

Block 2) includes the following actions.

A frequency of the power grid is acquired by a frequency sensor every action period $t_{act}$, and each local controller calculates a power deviation $\delta$ of all the air conditioners according to the acquired frequency of the power grid at the beginning of each action period $t_{act}$.

In some embodiments, each local controller calculates the real-time total power P(t) of all the air conditioners according to the received coordinating information (air temperature $T\alpha_i$, on-off state $state_i$ and power Pi of the air conditioners in all the rooms) broadcasted by the central controller via following equation:

$$P(t) = \sum_i P_i * state_i \qquad (13)$$

where, $i = 1, 2 \ldots N$, $P_i$ is the operation power of the $i^{th}$ air conditioner, $state_i$ is an on-off state of the $i^{th}$ air conditioner.

Then, the power deviation $\delta$ of all the air conditioners is calculated according to following equation.

$$\delta = P(t) - P0 - K\Delta f,$$

where, P(t) is the real-time total power of all the air conditioners, P0 is the reference power of all the air conditioners, K is a power-frequency response coefficient set for all the local controllers, $\Delta f$ is a real-time frequency deviation.

Each local controller determines whether the power deviation $\delta$ is in the action dead zone $\zeta$, when the power deviation $\delta$ is in the action dead zone $\zeta$, the air conditioner does not participate in the frequency regulation control, when the power deviation $\delta$ is not in the action dead zone $\zeta$, the air conditioner participates in the frequency regulation control action in the present action period.

In some embodiments, $\zeta$ may be set according to accuracy requirement, for example, in an embodiment, $\zeta$ is 1 KW.

In some embodiments, if $|\delta| \leq \zeta$, the power deviation $\delta$ is determined to be in the action dead zone $\zeta$.

In some embodiments, the above acts of "each local controller determines whether the power deviation $\delta$ is in the action dead zone $\zeta$, when the power deviation $\delta$ is in the action dead zone $\zeta$, the air conditioner does not participate in the frequency regulation control, when the power deviation $\delta$ is not in the action dead zone $\zeta$, the air conditioner participates in the frequency regulation control action in the present action period" includes following actions.

A temperature priority $Tpri_i$ of each local controller is obtained according to following equation.

$$Tpri_i = \begin{cases} (Ts_i - Ta_i)/\Delta_i, & state_i = 1 \\ (Ta_i - Ts_i)/\Delta_i, & state_i = 0 \end{cases} \qquad (14)$$

In which, $Tpri_i$ is a temperature priority of $i^{th}$ local controller, $T\alpha_i$ is the indoor air temperature, $Ts_i$ the required temperature corresponding to the $i^{th}$ air conditioner set by a user, $\Delta_i$ is the temperature control dead zone, $state_i$ is the on-off state of the i th air conditioner (ON corresponds 1, OFF corresponds to 0).

Equation (14) means that the air conditioner in a room where the air temperature is closer to a boundary of the temperature control dead zone corresponds a higher priority. When $state_i = 1$, i.e. the air conditioner is in an "ON" state, the lower the air temperature $T\alpha_i$ is, the higher the priority $Tpri_i$ is, and the air conditioner will be turned off more preferentially in a local frequency regulation process; When $state_i = 0$, i.e. the air conditioner is in an "OFF" state, the higher the air temperature $T\alpha_i$ is, the higher the priority $Tpri_i$ is, and the air conditioner will be turned on more preferentially in the local frequency regulation process.

When $\delta > \zeta$ temperature priorities $Tpri_i$ of air conditioners whose $state_i = 1$ are selected, and an array $qu_{ON}$ is generated accordingly with its rows arranged according to values of the temperature priorities $Tpri_i$ in a descending order, the first column of the array is $Tpri_i$, the second column is $P_i$, the third column is i, and the number of rows in the array $qu_{ON}$ is denoted as r, a minimum control set which can regulate the power deviation into the dead zone is selected according to $r^* = \{r | \pi_{d=1}^r qu_{ON}(d, 2) \geq \delta - \zeta\}$, a set $I_{ON}$ of numbers of the air conditioners to be regulated in the present operation is extracted from the minimum regulation control set according to $I_{ON} = qu_{ON}(j, 3)$, $j = 1, 2, L, r^*$, and $I_{ON}' = \{i \in I_{ON} | T\alpha_i < Tgon_i\}$ is calculated (in which, as a parameter represents a participating degree of the air conditioner in the frequency regulation, $Tgon_i$ may be preset by users of the air conditioners and people who controls the frequency regulation system, for example, $Tgon_i$ may be set as $\underline{T}_i+0.8\Delta_i$), if a number of an air conditioner controller $i_{local} \in I_{ON}'$, an air conditioner corresponding to the an air conditioner controller $i_{local}$ is controlled to participate in the present frequency regulation control, i.e. a state of the air conditioner corresponding to the an air conditioner controller $i_{local}$ is switched (turn off the local air conditioner), else, no action is performed.

When $\delta<-\zeta$, temperature priorities $Tpri_i$ of air conditioners whose $state_i=0$ are selected, and an array $qu_{OFF}$ is generated accordingly with its rows arranged according to values of the temperature priorities $Tpri_i$ in a descending order, the first column of the array is $Tpri_i$, the second column is $P_i$, the third column is i, and the number of rows in the array $qu_{OFF}$ is denoted as r, a minimum control set which can regulate the power deviation into the dead zone is selected according to $r^*=\min\{r|\Sigma_{d=1}^{r}qu_{OFF}(d,2)\geq -\delta=\zeta\}$, a set $I_{OFF}$ of numbers of the air conditioners to be regulated in the present operation is extracted from the the minimum regulation control set according to $qu_{OFF}(j,3)$, $j=1, 2, L, r^*$, and $I_{OFF}'=\{i \in I_{OFF} | T\alpha_i > Tgoff_i\}$ is calculated (in which, as a parameter represents a participating degree of the air conditioner in the frequency regulation, $Tgoff_i$ may be preset by users of the air conditioners and people who controls the frequency regulation system, for example, $Tgoff_i$ may be set as $\overline{T}_i-0.4\Delta_i$), if a number an air conditioner controller $i_{local} \in I_{OFF}'$, the air conditioner corresponding to the an air conditioner controller $i_{local}$ is controlled to participate in the present frequency regulation control, i.e. a state of the local air conditioner corresponding to the an air conditioner controller $i_{local}$ is switched (turn on the local air conditioner), else, no action is performed.

After the frequency regulation is finished, each local controller estimates the on-off states of all the air conditioners at a beginning of a next action period.

In some embodiments, the next action period is one action period $t_{act}$ ahead from the present moment.

Because on-off states of some of the air conditioners have been changed in the present action period, each local controller estimates the on-off states of all the air conditioners at the beginning of the next action period after each frequency regulation is finished.

The process of estimating the on-off states of all the air conditioners includes following actions.

The set $I_{ON}'$ or $I_{OFF}'$ are obtained.

It is set that i=1.

It is determined whether $i \in I_{ON}'$ to determine whether the i th air conditioner participates in the frequency regulation action, if $i \in i_{ON}$, the present state of the i th air conditioner is "OFF", i.e. $state_i=0$, and the air temperature $T\alpha_i^{tog}$ before the switch is flipped and the moment $t_i^{tog}$ when the switch is flipped are recorded. if $i \in I_{OFF}$, the present state of the i th air conditioner is "ON", i.e. $state_i=1$, and the air temperature $T\alpha_i^{tog}$ before the switch is shifted and the moment $t_i^{tog}$ when the switch is shifted are recorded;

Let i=i+1, if i≤N, the above acts of "it is determined whether $i \in I_{ON}$ to determine whether the i th air conditioner participates in the frequency regulation action, if $i \in I_{ON}$, the present state of the i th air conditioner is "OFF", i.e. $state_i=0$, and the air temperature $T\alpha_i^{tog}$ before the switch is flipped and the moment $t_i^{tog}$ when the switch is flipped are recorded. if $i \in I_{OFF}$, the present state of the i th air conditioner is "ON", i.e. $state_i=1$, and the air temperature $T\alpha_i^{tog}$ before the switch is shifted and the moment $t_i^{tog}$ when the switch is shifted are recorded" is executed, else, the acts of "each local controller estimates air temperatures in other rooms at the beginning of the next action period, and modifies on-off state $state_i$ of the i th air conditioner at the beginning of the next action period $t_{act}$ according to the coordinating parameters transmitted from the central controller and the on-off states of all the air conditioners" is executed.

The above acts of "a frequency of the power grid is acquired by a frequency sensor every action period $t_{act}$, and each local controller calculates a power deviation $\delta$ of all the air conditioners according to the acquired frequency of the power grid at the beginning of each action period $t_{act}$" is executed when the next action period comes, or block 1 is executed when the next communication interval begins.

The autonomous control method can refer to the above equations (6) and (7).

The acts of "each local controller estimates air temperatures in other rooms at the beginning of the next action period, and modifies on-off state $state_i$ of the i th air conditioner at the beginning of the next action period $t_{act}$ according to the coordinating parameters transmitted from the central controller and the on-off states of all the air conditioners" may include following acts.

A first-order thermal model is used for estimating the temperature in a present embodiment, for the i th air conditioner, a time variance relative to $t_i^{tog}$ at moment t is $\Delta t_i$, and i=1.

If the on-off state of the i th air conditioner stored locally is "ON", i.e. $state_i=1$, the room air temperature stored locally is $T\alpha_i(t)=\alpha_i^{ON}e^{\gamma_i^{ON}\Delta t_i}-\alpha_i^{ON}+T\alpha_i^{tog}$; if the on-off state of the i th air conditioner stored locally is "OFF", i.e. $state_i=0$, the room air temperature stored locally is $T\alpha_i(t)=\alpha_i^{OFF}e^{\gamma_i^{OFF}\Delta t_i}-\alpha_i^{OFF}+T\alpha_i^{tog}$.

If the room air temperature meets a condition $T\alpha_i(t)\leq \underline{T}_i$, the state of the i th air conditioner stored locally is $state_i=0$, and $T\alpha_i^{tog}$ and $t_i^{tog}$ are recorded, if the room air temperature meets a condition $T\alpha_i(t)\geq \overline{T}_i$, the state of the i th air conditioner stored locally is $state_i=1$, and $T\alpha_i^{tog}$ and $t_i^{tog}$ are recorded, else, the state of the i th air conditioner $state_i$ remains unchanged.

Let i=i+1, if i≤N, step the above acts of "if the on-off state of the i th air conditioner stored locally is "ON", i.e. $state_i=1$, the room air temperature stored locally is $T\alpha_i(t)=\alpha_i^{ON}e^{\gamma_i^{ON}\Delta t_i}-\alpha_i^{ON}+T\alpha_i^{tog}$; if the on-off state of the i th air conditioner stored locally is "OFF", i.e. $state_i=0$, the room air temperature stored locally is $T\alpha_i(t)=\alpha_i^{OFF}e^{\gamma_i^{OFF}\Delta t_i}-\alpha_i^{OFF}+T\alpha_i^{tog}$" is executed, else, the above acts of "a frequency of the power grid is acquired by a frequency sensor every action period $t_{act}$, and each local controller calculates a power deviation $\delta$ of all the air conditioners according to the acquired frequency of the power grid at the beginning of each action period $t_{act}$" is executed when the next action period $t_{act}$ comes, or, block 1 is executed if next communication moment comes.

The method for regulating the primary frequency of a power grid based on an air conditioner load cluster in a large building according to embodiments of the present disclosure has following characteristics.

With the method according to embodiments of the present disclosure, by taking advantage of heat capacity of large buildings, the two layers control structure including the central coordinating layer and the local control layer is formed, via rapid control of the air conditioner cluster, it is now possible to involve the air conditioner cluster in primary frequency regulation with a linear power-frequency characteristic similar to that of an electric generator. Each air conditioner performs a primary frequency regulation response locally to increase the speed of entire response, and communicate with the central controller every a certain time interval to upload local information and obtain overall coordinating information so as to ensure accuracy of the entire power-frequency linear response. Meanwhile, a temperature monitor threshold guarantees comfort of users and useful life of the equipment will not be significantly affected.

With the method according to embodiments of the present disclosure, a two-layer control structure including a slow centralized coordination and a rapid distributed local control is provided. In the centralized coordinating layer (i.e. the central coordinating layer), information of each room, such as operation power and state of corresponding air conditioner, the temperature in the room, thermal model parameters of the room, etc., is collected according to coordinating control period, and then is broadcasted to each of the local controllers. The problems of long time delay in centralized control and lack of coordination in distributed control are solved, thus improving the control accuracy and solving the problem of rebound effect.

The controllers in the local control layer estimate operation states of all the air conditioners and temperatures in all rooms based on dynamic thermal models respectively, and sequence the air conditioner cluster accordingly. Whether a local frequency regulation will be triggered is determined by an order of the air conditioner in the sequence and a real-time frequency deviation. The method is a local algorithm, thus improving speed of response to the power-frequency deviation.

With the method according to embodiments of the present disclosure, loads of the air conditioner cluster is a linear response to a frequency deviation and the comfort of users is not effected, the contradiction of slow response in central control and lack of coordinating information in local decentralized control when an air conditioner cluster participating in primary frequency regulation is eliminated. The control accuracy is increased and the problem of rebound effect is solved.

What is claimed is:

1. A method for regulating the primary frequency of a power grid based on an air conditioner load cluster in a large building, wherein,
a two-layer control structure comprising a central coordinating layer and a local control layer is used in the air conditioner load cluster, the central coordinating layer comprises a central controller, the local control layer comprises N local controllers, N air conditioners, and temperature sensors and frequency sensors provided in rooms the air conditioners are located in; and
the method comprises:
1) performing, by each local controller, a thermal model parameter identification and an air conditioner autonomous control to obtain local information corresponding to each of the air conditioners, and uploading the local information to the central controller at an end of each communication interval $t_{gap}$, and broadcasting, by the central controller, coordinating information to each local controller, wherein the central controller and the local controllers communicate at each communication interval;
2) when a communication between the central controller and each of the local controllers in step 1) is finished, based on the coordinating information sent from the central controller, determining, by each local controller, whether a power deviation of all the air conditioners is beyond an action dead zone at a beginning of each action period $t_{act}$, if yes, a frequency regulation control action is performed, else, no action is performed and operation states of all the air conditioners at a beginning of a next action period are estimated; if a current time reaches to a beginning of a next communication interval, step 1) is executed, else, step 2) is repeated, wherein the local controllers regulate and control the air conditioners at each action period.

2. The method according to claim 1, wherein, step 1) comprises:
1-1) performing, by each local controller i, i=1.2 . . . N, the room thermal model parameter identification according to air temperature data recorded at each temperature acquisition period to obtain thermal model parameters corresponding to each room, wherein the local controllers acquire data from the temperature sensors at each temperature acquisition period;
1-2) identifying, by the local controller i, parameters of the thermal model corresponding to an $i^{th}$ room according to air temperature data recorded at each temperature acquisition period $t_{temp}$ in a communication interval $t_{gap}$ to obtain identified thermal model parameters of each room;
1-3) performing, by each local controller, the air conditioner autonomous control according to the following equations:

$$\text{state}_i = \begin{cases} 1, & Ta_i \geq \overline{T}_i \ \& \ \text{state}_i = 0 \\ 0, & Ta_i \leq \underline{T}_i \ \& \ \text{state}_i = 1 \end{cases} \quad (6)$$

$$\overline{T}_i = Ts_i + \Delta_i, \ \underline{T}_i = Ts_i - \Delta_i \quad (7)$$

where, i=1.2 . . . N, $Ta_i$ is an air temperature in the $i^{th}$ room, $\Delta_i$ is a temperature control dead zone corresponding to an $i^{th}$ air conditioner, $\overline{T}_i$ corresponds to an upper bound of the temperature control dead zone $\Delta_i$, $\underline{T}_i$ corresponds to a lower bound of the temperature control dead zone $\Delta_i$, $Ts_i$ is the required temperature corresponding to the $i^{th}$ air conditioner set by the user, $\text{state}_i$ is the on-off state of the $i^{th}$ air conditioner, wherein $\text{state}_i=1$ corresponds to state ON, $\text{state}_i=0$ corresponds to state OFF;
1-4) at an end moment of the communication interval $t_{gap}$ between the local controller and the central controller, uploading, by each local controller, the local information to the central controller, wherein the local information comprises the indoor air temperature acquired most recently $Ta_i$ of the $i^{th}$ room, the on-off state $\text{state}_i$, operation power $P_i$ the required temperature $Ts_i$, the temperature control dead zone $\Delta_i$, and the thermal model parameters $\alpha_i^{ON}$, $\gamma_i^{ON}$, $\alpha_i^{OFF}$, $\gamma_i^{OFF}$, $Ta_i^{log}$, and $t_i^{log}$;
1-5) collecting, by the central controller, all the local information from the local controllers and broadcasting all collected information to each local controller as the coordinating information, obtaining, by the central controller, a reference power $P0_i$ of each air conditioner after the thermal model parameters corresponding to each local controller are collected, obtaining a reference power $P0$ of all the air conditioners by summing reference powers of all the air conditioners, and broadcasting the reference power of all the air conditioners to each of the local controllers, wherein the coordinating information comprises the indoor air temperature $Ta_i$, the on-off state $\text{state}_i$, the operation power $P_i$, the required temperature $Ts_i$, the temperature control dead zone $\Delta_i$, and the thermal model parameters $\alpha_i^{ON}$, $\gamma_i^{ON}$, $\alpha_i^{OFF}$, $\gamma_2^{OFF}$, $T\alpha_i^{tog}$, and $t_i^{tog}$, wherein the coordination coordinating information comprises indoor air temperatures, on-off states, operation powers, required temperatures, temperature control dead zones, and thermal model parameters uploaded by all the local controllers.

3. The method according to claim 2, wherein a precision degree of the thermal model parameters is determined according to a hardware storage capability of the local controller and an error requirement between a thermal model identification curve and an actual temperature curve.

4. The method according to claim 3, wherein the thermal model corresponding to $i^{th}$ room comprises a zero-order thermal model, a first-order thermal model, or a second-order thermal model, represented by equations (1)-(3) respectively:

$$\Delta T_i = \alpha_i \Delta t_i \quad (1)$$

$$\Delta T_i = \alpha_i e^{\gamma_i \Delta t_i} - \alpha_i \quad (2)$$

$$\Delta T_i = \alpha_{i1} e^{\gamma_{i1} \Delta t_i} + \alpha_{i2} e^{\gamma_{i2} \Delta t_i} - \alpha_{i1} - \alpha_{i2} \quad (3)$$

where, a numbers of parameters to be identified in the zero-order thermal model, the first-order thermal model and the second-order thermal model are 1, 2, and 4, respectively, $\alpha_i$ in equation (1) is a thermal model parameter to be identified in the zero-order thermal model, $\alpha_i$, $\gamma_i$ in equation (2) are thermal model parameters to be identified in the first-order thermal model, $\alpha_{i1}$, $\gamma_{i1}$, $\alpha_{i2}$, $\gamma_{i2}$ in equation (3) are thermal model parameters to be identified in the second-order thermal model, $\Delta T_i$ is a difference between a current temperature $T\alpha_i$ and an indoor temperature $T\alpha_i^{tog}$ when an on-off state of the air conditioner is last switched, and $\Delta t_i$ is a difference between a current time and a time $t_i^{tog}$ when an on-off state of the air conditioner is last switched, where, $$\Delta T_i = T\alpha_i - T\alpha_i^{tog} \quad (4)$$

$$\Delta t_i = t_i - t_i tog \quad (5)$$

wherein, $T\alpha_i^{tog}$ and $t_i^{tog}$ are thermal model parameters.

5. The method according to claim 4, if the thermal model corresponding to $i^{th}$ room is the first-order thermal model, the thermal model parameters comprises $\alpha_i^{ON}$, $\gamma_i^{ON}$ and $\alpha_i^{OFF}$, $\gamma_i^{OFF}$.

6. The method according to claim 2, wherein the reference power $P0_i$ corresponds to an average power of the $i^{th}$ air conditioner during an on-off period $T_i$ in a communication interval $t_{gap}$, and step 1-5) comprises:
obtaining, by the central controller, a first time $t_i^{(1)}$, a second time $t_i^{(1)}$, a third time $t_i^{(1)}$, and a fourth time $t_i^{(1)}$ by solving the following equations respectively according to the upper $\overline{T_i}$, the lower temperature bound $\underline{T_i}$, the thermal model parameters $\alpha_i^{ON}$, $\gamma_i^{ON}$, $\alpha_i^{OFF}$, $\gamma_i^{OFF}$, $T\alpha_i^{tog}$, and $t_i^{tog}$, the required temperature $Ts_i$, and the temperature control dead zone $\Delta_i$:

$$\overline{T_i} - T\alpha_i^{tog} = \alpha_i^{ON} e^{\gamma_i^{ON}(t_i^{(1)} - t_i^{tog})} - \alpha_i^{ON},$$

$$\underline{T_i} - T\alpha_i^{tog} = \alpha_i^{ON} e^{\gamma_i^{ON}(t_i^{(2)} - t_i^{tog})} - \alpha_i^{ON},$$

$$\overline{T_i} - T\alpha_i^{tog} = \alpha_i^{OFF} e^{\gamma_i^{OFF}(t_i^{(3)} - t_i^{tog})} - \alpha_i^{OFF},$$

$$\underline{T_i} - T\alpha_i^{tog} = \alpha_i^{OFF} e^{\gamma_i^{OFF}(t_i^{(4)} - t_i^{tog})} - \alpha_i^{OFF},$$

wherein, $t_i^{(1)}$ is a moment when the indoor temperature is equal to the upper bound temperature $\overline{T_i}$ and the air conditioner is in an "ON" state; $t_i^{(2)}$ is a moment when the indoor temperature is equal to the lower bound temperature $\underline{T_i}$ and the air conditioner is in an "ON" state; $t_i^{(3)}$ is a moment when the indoor temperature is equal to the upper bound temperature $\overline{T_i}$ and the air conditioner is in an "OFF" state; $t_i^{(4)}$ is a moment when the indoor temperature is equal to the lower bound temperature $\underline{T_i}$ and the air conditioner is in an "OFF" state;

obtaining a total time period $Ton_i$ when the $i^{th}$ air conditioner is in an "ON" state in an on-off period $T_i$, and a total time period $Toff_i$ when the $i^{th}$ air conditioner is in an "OFF" state in an on-off period $T_i$ according to following equations:

$$Ton_i = t_i^{(1)} - t_i^{(2)} \quad (8)$$

$$Toff_i = t_i^{(4)} - t_i^{(3)} \quad (9)$$

obtaining the reference power $P0_i$ of each air conditioner as:

$$P0_i = \frac{Ton_i}{T_i} P_i = \frac{Ton_i}{Ton_i + Toff_i} P_i \quad (10)$$

wherein, $P0_i$ is a reference power of the $i^{th}$ air conditioner, $Ton_i$ is the total time period when the $i^{th}$ air conditioner is in an "ON" state in an on-off period $T_i$, $Toff_i$ is the total time period when the $i^{th}$ air conditioner is in an "OFF" state in an on-off period $T_i$, $P_i$ is an operation power of the $i^{th}$ air conditioner;

obtaining the reference power of all the air conditioners $P0$ by summing all the reference powers $P0_i$ of the air conditioners according to following equation:

$$P0 = \sum_i P0_i; \quad (11)$$

broadcasting, by the central controller, the reference power $P0$ of all the air conditioners to each local controller.

7. The method according to claim 1, wherein, step 2) comprises:
2-1) acquiring, by a frequency sensor, a frequency of the power grid every action period $t_{act}$ and calculating, by each local controller, a power deviation $\delta$ of all the air conditioners according to the acquired frequency of the power grid at the beginning of each action period $t_{act}$;
2-2) determining, by each local controller, whether the power deviation $\delta$ is in the action dead zone $\zeta$, when the power deviation $\delta$ is in the action dead zone $\zeta$, the air conditioner does not participate in the frequency regulation control; when the power deviation $\delta$ is not in the action dead zone $\zeta$, the air conditioner participates in the frequency regulation control action in the present action period;
2-3) estimating, by each local controller, on-off states of all the air conditioners at a beginning of a next action period;
2-4) estimating, by each local controller, air temperatures in other rooms at the beginning of the next action period, and modifying the on-off state $state_i$ of the $i^{th}$ air conditioner at the beginning of the next action period $t_{act}$ according to the coordinating parameters transmitted from the central controller and estimated on-off states of all the air conditioners via the air conditioner autonomous control in step 1-2), and executing step 2-1) when the next action period comes or executing step 1) when a next communication interval begins.

8. The method according to claim 7, wherein, step 2-1) comprises:

calculating, by each local controller, a real-time total power P(t) of all the air conditioners according to the received coordinating information broadcasted by the central controller via following equation:

$$P(t) = \sum_i P_i * \text{state}_i \quad (13)$$

where i=1.2 ... N, $P_i$ is an operation power of the $i^{th}$ air conditioner, $\text{state}_i$ is an on-off state of the $i^{th}$ air conditioner;

calculating the power deviation δ of all the air conditioners according to following equation:

$$\delta = P(t) - P0 - K\Delta f,$$

where, P(t) is the real-time total power of all the air conditioners, P0 is the reference power of all the air conditioners, K is a power-frequency response coefficient set for all the local controllers, and Δf is a real-time frequency deviation.

9. The method according to claim 7, wherein, step 2-2) comprises:

2-2-1) obtaining a temperature priority $Tpri_i$ of each local controller according to following equation:

$$Tpri_i = \begin{cases} (Ts_i - Ta_i)/\Delta_i, & \text{state}_i = 1 \\ (Ta_i - Ts_i)/\Delta_i, & \text{state}_i = 0 \end{cases} \quad (14)$$

where, $Tpri_i$ is a temperature priority of $i^{th}$ local controller, $Ta_i$ is the indoor air temperature, $Ts_i$ is the required temperature corresponding to the $i^{th}$ air conditioner set by the user, $\Delta_i$ is the temperature control dead zone, $\text{state}_i$ is the on-off state of the $i^{th}$ air conditioner;

2-2-2) when δ>ζ, selecting temperature priorities of air conditioners whose $\text{state}_i$=1, and generating an array $qu_{ON}$ accordingly with its rows arranged according to values of the temperature priorities in a descending order, wherein, a first column of the array is the temperature priorities, a second column is operation powers corresponding to the temperature priorities, a third column is mark numbers of air conditioners corresponding to the temperature priorities, and a number of rows in the array $qu_{ON}$ is denoted as r; selecting a minimum regulation control set which can regulate the power deviation into the dead zone according to $r^*=\min\{r|\Sigma_{d=1}^{r} qu_{ON}(d, 2) \geq \delta-\zeta\}$, extracting a set of mark numbers of air conditioners to be regulated in a present operation from the minimum regulation control set according to $I_{ON}=qu_{ON}(j, 3)$, j=1, 2, L, r*, and calculating $I_{ON}'=\{i \in I_{ON}|Ta_i<Tgon_i\}$; if a number of an air conditioner controller $i_{load} \in I_{ON}'$, trolling an air conditioner corresponding to the an air conditioner controller $i_{local}$ to participate in the present frequency regulation control, i.e. switching a state of the air conditioner corresponding to the an air conditioner controller $i_{local}$, else, performing no action;

2-2-3) when δ<-ζ, selecting temperature priorities of air conditioners whose $\text{state}_i$=0, and generating an array $qu_{OFF}$ accordingly with its rows arranged according to values of the temperature priorities in a descending order, wherein, a first column of the array $qu_{OFF}$ is the temperature priorities, a second column is operation powers corresponding to the temperature priorities, a third column is mark numbers of air conditioners corresponding to the temperature priorities, and a number of rows in the array $qu_{OFF}$ is denoted as r; selecting a minimum regulation control set which can regulate the power deviation into the dead zone according to $r^*=\min\{|\Sigma_{d=1}^{r} qu_{OFF}(d, 2) \geq -\delta-\zeta\}$, extracting a set of mark numbers of air conditioners to be controlled in a present operation from the minimum regulation control set according to $I_{OFF}=qu_{OFF}(j, 3)$, j=1, 2, L, r*, and calculating $I_{OFF}'=\{i \in I_{OFF}|Ta_i>Tgoff_i\}$, if a number of an air conditioner controller $i_{local} \in I_{OFF}'$, controlling the air conditioner corresponding to the an air conditioner controller $i_{local}$ to participate in the present frequency regulation control, i.e. switching a state of the air conditioner corresponding to the an air conditioner controller $i_{local}$, else, performing no action.

10. The method according to claim 1, wherein the central controller and the local controllers communicate in bothways at each communication interval, the local controllers acquire data from the temperature sensors at each temperature acquisition period.

11. The method according to claim 1, wherein the local controllers regulate and control the air conditioners once during each action period according to local information and coordination coordinating information transmitted from the central controller.

12. The method according to claim 1, wherein each of the air conditioners is constant power air conditioner with an operation power and having two states: ON and OFF.

13. The method according to claim 1, wherein each temperature sensor acquires an indoor air temperature of a corresponding room in real-time, and the local controller acquires temperature data from the temperature sensors at each temperature acquisition period.

* * * * *